US006514623B2

(12) United States Patent
Endisch et al.

(10) Patent No.: US 6,514,623 B2
(45) Date of Patent: *Feb. 4, 2003

(54) WEAR-RESISTING, INK-REPELLENT COATING PROCESS FOR PRINTING-PRESS COMPONENTS

(75) Inventors: Martin Endisch, Wertingen (DE); Markus Kirst, Büttelborn (DE); Gerhard Johner, Gelnhausen (DE)

(73) Assignee: MAN Roland Druckmaschinen AG, Offenbach am Main (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,239

(22) Filed: Nov. 5, 1999

(65) Prior Publication Data

US 2002/0068179 A1 Jun. 6, 2002

(30) Foreign Application Priority Data

Nov. 5, 1998 (DE) ........................................ 198 50 968

(51) Int. Cl.[7] ................................................ B32B 9/04

(52) U.S. Cl. ...................... 428/447; 428/450; 101/457; 101/458; 101/480

(58) Field of Search ............................... 428/447, 450; 101/480, 457, 458

(56) References Cited

U.S. PATENT DOCUMENTS

| | | | | |
|---|---|---|---|---|
| 4,308,799 A | | 1/1982 | Kitagawa | 101/457 |
| 4,724,764 A | | 2/1988 | MacPhee et al. | 101/451 |
| 5,429,872 A | | 7/1995 | Nakamura | 428/391 |
| 5,644,828 A | | 7/1997 | Sailer et al. | 29/402.06 |
| 6,077,207 A | * | 6/2000 | Yokoyama et al. | 428/447 |
| 6,324,978 B1 | | 12/2001 | Kaulen et al. | 101/459 |

FOREIGN PATENT DOCUMENTS

| | | | |
|---|---|---|---|
| DE | 29 14 255 | 11/1979 | B41F/13/08 |
| DE | 42 42 620 A1 | 6/1994 | B41F/31/10 |
| DE | 43 20 069 | 1/1995 | B41F/13/10 |
| DE | 691 23 561 T2 | 7/1997 | B41C/1/10 |
| EP | 0 629 514 | 11/1993 | B41N/10/04 |
| EP | 0 694 584 | 7/1995 | C08L/83/07 |
| GB | 2 022 016 | 5/1979 | B41F/13/18 |
| GB | 2 022 016 | 12/1979 | B41F/13/18 |
| GB | 2 057 094 | 8/1980 | F16C/13/00 |
| GB | 2 260 987 | 5/1993 | C08L/83/07 |
| JP | 10157323 | 6/1998 | B41N/7/00 |

OTHER PUBLICATIONS

Japan Patent Abstract JP 0060122186 AA, May 6, 1994.

* cited by examiner

*Primary Examiner*—Margaret G. Moore
(74) *Attorney, Agent, or Firm*—Cohen, Pontani, Lieberman & Pavane

(57) ABSTRACT

A wear-resistant, ink-repellent coating, for printing-press components, and in particular, web-fed printing presses. In order to provide a seal for this low-wear coating which results in a permanent ink-repellent surface quality and which additionally has a high resistance to standard cleaning agents used in printing technology, the printing-press component which is to be protected is first provided with oxide ceramic or hard metal layer. This layer may be applied by thermal spraying. In addition, the component is treated with a polyorganosiloxane sealant, particularly polyhydridomethylsiloxane, including the necessary heat-curing at moderate temperatures of from 100° C. to 170° C. so as to prevent ink deposition. The sealing may also take place after the wear-resistant layer has undergone a grinding and polishing treatment.

11 Claims, No Drawings

WEAR-RESISTING, INK-REPELLENT COATING PROCESS FOR PRINTING-PRESS COMPONENTS

BACKGROUND OF THE INVENTION

1. Field of the Invention

The invention relates to printing presses, and more particularly to a wear-resisting, ink-repellent coating process for printing-press components.

2. Description of the Related Art

In various areas of a printing press, there is a need for surfaces which have a high resistance to wear resulting from sliding movements of the paper and, at the same time, these surfaces must not become wet either by absorbed or fresh offset printing ink.

The deposition of ink ultimately results in a change in the dimensions of the components to which it is applied. As a result, in addition to smearing of the printed paper, precision also declines until ultimately the folding unit, for example, fails to function. Increasing paper speeds intensifies both the wear problem and the problem of ink deposition.

The same can also be said of the sheet turner, since in this component sheets of paper which have been printed on both sides have to be transported in an accurate position and at increasing speeds without any ink being absorbed. With regard to this problem, it has already been attempted, in accordance with DE 29 14 255 A1, to counteract wear and ink deposition by means of special cylinder coatings, consisting of wear-resistant metals or metal oxides, as well as a sealing material which is anchored therein.

In DE 29 14 255 A1, sealing materials mentioned are Teflon and copying ink. However, both sealing materials are known to have an insufficiently long service life in rapid web-fed printing presses and, in the case of Teflon, also lead to substantial heating of the component which is to be coated, which may result in dimensional distortion. The sintering temperature of Teflon is in the region of 300° C. and is therefore sufficiently high to cause dimensional distortion on precision rollers, in particular where welded structures are involved.

Ink-repellent surface properties are required not only to convey the printed paper in the printing press, but also, in the case of waterless offset printing (also known as the TORAY process), for substituting the film of dampening solution on the printing plate in the form of a silicone film. The term silicone encompasses a substantial group of synthetic polymeric compounds in which silicon atoms are crosslinked in chain and/or network form via oxygen atoms, and the remaining valences of the silicon being saturated by hydrocarbon radicals (usually methyl groups). Another name for silicones is polyorganosiloxanes.

In addition to their virtually perfect ink-repellent properties, these silicone films on the waterless printing plates also have a surprisingly high resistance to abrasion. This is a result of the fact that in numerous modern presses the so called delta effect is used to eliminate printing residues, such as for example grains of paper or dust. The delta effect is nothing other than a slight slippage, in the percentage range, between the roller for applying dampening solution and the plate cylinder and is described extensively in U.S. Pat. No. 4,724,764.

SUMMARY OF THE INVENTION

The invention is based on the object of finding a seal for low wear coatings on printing press components which provides a permanent ink-repellent surface quality and, in addition, has a high resistance to standard cleaning agents used in printing technology.

This and other objects are achieved in accordance with the present invention wherein the wear-resisting ink-repellent coating for printing press components comprises a wear resistant material in the form of one of metal oxides and low-wear hard metals, and a sealing material for treating the wear resistant material. The sealing material comprises a polyorganosiloxane sealant that cures in a temperature range of 100° C. to 170° C.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

According to the present invention, the printing-press component is by a wear-resisting layer, preferably of oxide ceramic, such as for example $Al_2O_3$, $Cr_2O_3$, $TiO_2$, $SiO_2$ $ZrO_2$, $Y_2\ O_a$,$C_e$ O, $C_a$ O, $M_g$ O or mixtures thereof, or of low-wear hard metals, such as for example WC/Co, $Cr_3$ $C_2$/Ni,Cr3C2/NiCr, NiCrBSi, WC/Ni, TiC/Ni, molybdenum etc. The wear resisting layer is preferably applied by thermal spraying processes, such as atmospheric plasma spraying, halogen flame spraying, and high-speed flame spraying. The wear resisting layer is then sealed with a polyorganosiloxane sealant, and preferably with polyhydridomethylsiloxane, which cures at from 100° C. to 170° C.

Depending on the printing-press component, surface qualities which entail a grinding and polishing operation after coating may be necessary. In such cases, it is advantageous to carry out the grinding operation immediately after coating so that the sealing with a polyhydridomethylsiloxane sealant is performed only after the grinding treatment.

Due to the moderate curing temperatures of the sealant of the polyorganosiloxane type, particularly polyhydridomethylsiloxane, retrospective sealing in a locally limited manner in the printing press is also possible, without requiring the removal of the corresponding component from the press.

In a preferred embodiment, the coating which provides protection against wear is from 0.03 to 1.5 mm thick, and is preferably 0.1 mm thick.

The coating, sealing and curing may also be performed on a printing-press component which consists not of steel but rather of lightweight construction materials, such as aluminum, magnesium, titanium or fiber-reinforced plastic.

The oxide ceramic or hard metal layer which protects against wear does not have to be applied by thermal spraying, but may also be applied by coating processes such as PVD (physical vapor deposition), CVD (chemical vapor deposition), sintering, hot isostatic pressing, electrodeposition, explosive cladding, build-up welding, soldering, adhesive-bonding techniques or reactive processes.

Furthermore, it is possible according to an embodiment of the wear-resisting, ink-repellent coating method of the invention, to set a surface roughness of the layer which protects against wear which is appropriate to its function, preferably of between 1.0 $\mu$m <Rz <90 $\mu$m, where Rz is preferably within a range of 15 to 20 $\mu$m.

The invention is not limited by the embodiments described above which are presented as examples only but can be modified in various ways within the scope of protection defined by the appended patent claims.

We claim:

1. A wear-resisting ilk-repellent coating for printing press components comprising:

a wear resistant material comprising one selected from the group consisting of metal oxides and low-wear hard metals, wherein the metal oxides comprise an oxide ceramic layer for protecting against wear, said oxide ceramic layer comprising at least one selected from a group of oxide ceramics consisting of $Y_2O_3$, CeO, CaO, MgO and mixtures of the oxide ceramics and wherein the low-wear hard metals comprises at least one selected from a group consisting of WC/Ni, TiC/Ni, Cr3C2/Ni, NiCrBSi, molybdenum and mixtures of these hard metals; and a sealing material for treating the wear resistant material, said sealing material comprising a polyorganosiloxane and being cured at a temperature of 170° C thereby allowing retrospective sealing of the wear-resistant material without requiring removal from the printing press and providing a long life and an ink-repellent characteristic for said wear-resisting ink-repellent coating, said coating having a thickness of 0.1 mm.

2. The wear-resisting ink-repellent coating in accordance with claim 1, wherein said sealant comprises poyhydriomethylsiloxane.

3. The process set forth in claim 1, wherein the printing-press component formed by a lightweight construction material selected from a group consisting of magnesium and titanium.

4. A process for applying a coating to printing press components comprising the steps of:

applying a layer comprising one selected from the group consisting of a metal oxide and a low-wear hard metal to the printing component to protect against wear, wherein the metal oxides comprise an oxide ceramic layer for protecting against wear, said oxide ceramic layer comprising at least one selected firm a group of oxide ceramics consisting of $Y_2O_3$, CeO, CaO, MgO and mixtures of the oxide ceramics and wherein the low-wear hard metals comprises at least one selected from a group consisting of WC/Ni, TiC/Ni, Cr3C2/Ni, NiCrBSi, molybdenum and mixtures of these hard metals;

grinding the applied layer;

polishing the ground layer;

sealing the applied layer with a sealant of a polyorganosiloxane type after said step of polishing, said sealing being performed by heat-curing the polyorganosiloxane material exhibiting strong ink-repellent properties; and heat curing the sealant at a temperature of 170 ° C. whereby the sealing material provides a long life and ink-repellent characteristics for the coating.

5. The process set forth in claim 4, wherein said sealing is heat cured at temperatures in a range of 100° C. to 170° C.

6. The process set forth in claim 4, wherein said sealing is performed without removing the printing press component from the printing press.

7. The process set forth in claim 4, wherein the printing press component comprises a lightweight construction material selected from a group consisting of magnesium and titanium.

8. The process set forth in claim 4, wherein said step of applying is performed by thermal spraying, said thermal spraying comprising one selected from a group consisting of atmospheric plasma spraying and halogen flame spraying.

9. The process set forth in claim 4, said step of applying is performed by a coating process comprising one selected from a group consisting of physical vapor deposition (PVD), chemical vapor deposition (CVD), sintering, hot isostatic pressing, electro-deposition, explosive cladding, build up welding, soldering, adhesive-bonding techniques, and reactive processes.

10. The process set forth in claim 4, wherein said step of polishing the ground layer comprises polishing the ground layer such that the polished layer has a surface roughness (Rz) being set within a range of 1.0 $\mu$m <Rz <90 $\mu$m.

11. The process set forth in claim 4, wherein said step of polishing the layer comprises polishing the ground layer such that the polished layer has a surface roughness in a range of 15 $\mu$m to 20 $\mu$m.

* * * * *